United States Patent
Lindstrom-Tamer

(10) Patent No.: US 6,664,974 B2
(45) Date of Patent: Dec. 16, 2003

(54) METHOD FOR USING MULTIPURPOSE INTERNET MAIL EXTENSION TYPES FOR AUTOMATICALLY DETECTING SCALABLE VECTOR GRAPHICS SUPPORT IN CLIENT BROWSERS

(75) Inventor: Ana M. Lindstrom-Tamer, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 374 days.

(21) Appl. No.: 09/746,509

(22) Filed: Dec. 26, 2000

(65) Prior Publication Data

US 2002/0124076 A1 Sep. 5, 2002

(51) Int. Cl.[7] .................................................. G09G 5/00
(52) U.S. Cl. ........................ 345/619; 345/760; 345/763
(58) Field of Search ................................. 709/200, 218, 709/206; 715/503; 705/9; 345/619, 760, 763, 418, 636

(56) References Cited

U.S. PATENT DOCUMENTS

| | | |
|---|---|---|
| 6,057,854 A | 5/2000 | Davis, Jr. et al. |
| 6,076,166 A | 6/2000 | Moshfeghi et al. |
| 6,415,313 B1 * | 7/2002 | Yamada et al. ............. 709/200 |
| 6,565,609 B1 * | 5/2003 | Sorge et al. ................ 715/503 |
| 2002/0065701 A1 * | 5/2002 | Kim et al. ...................... 705/9 |
| 2002/0109729 A1 * | 8/2002 | Dutta ......................... 345/790 |
| 2003/0101235 A1 * | 5/2003 | Zhang ........................ 709/218 |

FOREIGN PATENT DOCUMENTS

WO    WO 00-49528    8/2000

* cited by examiner

Primary Examiner—Le Hien Luu
(74) Attorney, Agent, or Firm—William J. Kubida; Carol W. Burton; Hogan & Hartson LLP

(57) ABSTRACT

A method for automatically determining whether a browser supports scalable vector graphics ("SVG"). The method uses a two prong process to make a proper detection for various types of browsers. The method includes using JavaScript to detect Multipurpose Internet Mail Extensions ("MIME") types from the browser to detect SVG support. If scanning of the MIME types detects that SVG support is present, the requested web page containing SVG content is sent. If no SVG support is detected, the non-SVG version of the web page is sent to the browser. If the browser does not return a list of MIME types, the method of Visual Basic Scripting Edition language ("VBScript") to instruct the browser to create an SVG object on the client device. If the object is created, SVG support has been detected, and the browser is served the web page having SVG content.

14 Claims, 2 Drawing Sheets

METHOD FOR USING MULTIPURPOSE INTERNET MAIL EXTENSION TYPES FOR AUTOMATICALLY DETECTING SCALABLE VECTOR GRAPHICS SUPPORT IN CLIENT BROWSERS

BACKGROUND OF THE INVENTION

1. Field of the Invention

The present invention relates to automated methods for determining whether Internet browsers support particular hardware-independent page description languages. More particularly, the present invention relates to a method for detecting whether a client Internet browser is capable of displaying scalable vector graphics.

2. Discussion of the Related Art

The World Wide Web (the "web") is part of the Internet that organizes information contained in documents using hyper media. Each Web document, or "web page" can contain information in the form of text or embedded references to images, audio and video clips, or other documents via hyperlinks. A web user accesses Internet sites having web pages ("web sites") through various computer applications called web browsers and navigates through the information provided by the web pages. In an effort to make web pages uniformly readable by all types of browsers, the web has evolved such that web pages are typically specified in terms of content and format by one of several hardware and browser independent page description languages that are well known in the art, including, but not limited to, markup languages such as HTML, SHML, XML and XSL, and scripting languages such as JavaScript. As page description languages, graphical formats, and other languages, technologies and formats related to the web page art evolve, however, the situation often arises wherein a relatively new language or technology (or newer version of such a language/technology) is not supported by one or more commercially popular web browsers. Thus, web site developers are faced with browser compatibility problems when they attempt to incorporate newer useful technologies into their web sites; often, they simply cannot incorporate the new technology into their site without alienating a significant amount of web traffic.

A technique currently employed by web developers to address this problem comprises creating two essentially identical versions of the same web page. The first web page version is written using the new technology, and the second web page is essentially a copy of the first web page but the second web page version is written using only older and more widely universal technologies. The web developer then creates two hyperlinks on a predecessor page, one for connecting a user's browser to the first web page version and the other for connecting it to the second web page version. The web user is thereby instructed to manually select one of the two hyperlinks on the predecessor page depending upon whether his or her browser can or cannot support the newer technology.

This technique has several inherent drawbacks. First, due to, among other things, the fact that a large portion of web users lack technical savvy, or the practice of Internet service providers placing custom "skins" on commercially available browsers to change their graphical appearances, or both, web users are often not aware of what type of version of browser they are using. Thus, they cannot easily and accurately decide which hyperlink to choose. Additionally, even if a given web user knows which hyperlink to select, the user is still burdened with the task of having to manually select the proper hyperlink. As such, this solution remains inelegant and thus undesirable.

Scalable vector graphics ("SVG") is a relatively new vector graphics language whose code is designed to be incorporated directly into the code of web pages written in XML or HTML. Because of SVG's ability to be coded directly within XML or HTML web pages, it provides several useful features including: easily defined links to parts of an image, resolution independence wherein the SVG image can automatically be scaled up or down to fit into any size display, searchable text for SVG images, and animation support.

Currently, not all web browsers support SVG. Therefore, web developers cannot simply add SVG content to their web sites and expect every visitor to the web site to be able to view that content. However, the SVG language is a candidate recommendation of the World Wide Web Consortium ("W3C"), and SVG is rapidly gaining popularity within the web developing community.

While web developers can currently incorporate SVG into their websites without alienating certain users by using the manual hyperlinking technique, this approach still inherently suffers from the drawbacks outlined above. Therefore, there remains a need in the art for a manner in which one could easily detect whether a client browser supports SVG output such that SVG information could be automatically transmitted or omitted depending upon whether a particular user's browser supports SVG.

SUMMARY OF THE INVENTION

Accordingly, the present invention is an improvement over prior art methods for displaying pages containing SVG content that enables the automatic detection of whether a particular browser supports SVG.

In light of the above and other drawbacks inherent in the prior art, it is an object of the present invention to provide a method for automatically detecting whether a web page request has originated from a browser that supports SVG.

Further, it is an object of the present invention to provide a method for automatically determining whether a web browser has an available plug-in that supports SVG.

Additional objects, features and advantages of the invention will be set forth in the description that follows, and in part will be apparent from the description, or may be learned by practice of the invention. The objectives and other advantages of the invention will be realized and attained by the exemplary embodiments particularly pointed out in the written description and claims hereof as well as in the appended drawings.

To achieve these and other advantages and in accordance with the purpose of the present invention, as embodied and broadly described, the method for automatically determining whether a browser supports SVG includes the steps of receiving a request from the browser for a particular web page that is available in either with or without SVG content. In response to the request, JavaScript is used to request a list of supported Multipurpose Internet Mail Extensions ("MIME") types from the browser. If the browser returns a list of the requested MIME types, the returned list is scanned to detect SVG support. If scanning of the MIME types detects that SVG support is present, the requested web page is sent containing SVG content. If no SVG support is detected in the returned MIME types, the web page is sent to the browser without SVG content.

In the event that the browser does not return a list of MIME types in response to the JavaScript request, the method further comprises using Visual Basic Scripting Edition language (or "VBScript") to attempt to have the browser create an SVG object on the client device. If the object is created successfully, then SVG support has been detected and the browser is served the web page with SVG content. If an error is returned in response to the attempt to create an SVG object, then SVG support is not present and the browser is served the web page without SVG content.

In alternative embodiments of the present invention, the method includes using JavaScript to request from the browser a list of its available plug-ins, and scanning a returned plug-in list to determine whether SVG is supported. If an SVG support plug-in is not detected in the returned list, VBScript is used as described above to instruct the browser to attempt to create an SVG object on the client device and to detect SVG support in that manner.

In preferred embodiments, the invention can be incorporated into web page design and serving protocols such that web users would not have to manually select that their browser supports SVG in order to view SVG content. The invention thereby greatly simplifies the task of web surfing and gives web developers increased flexibility in incorporating SVG content into their web sites.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION OF THE PREFERRED EMBODIMENTS

Figure 1:
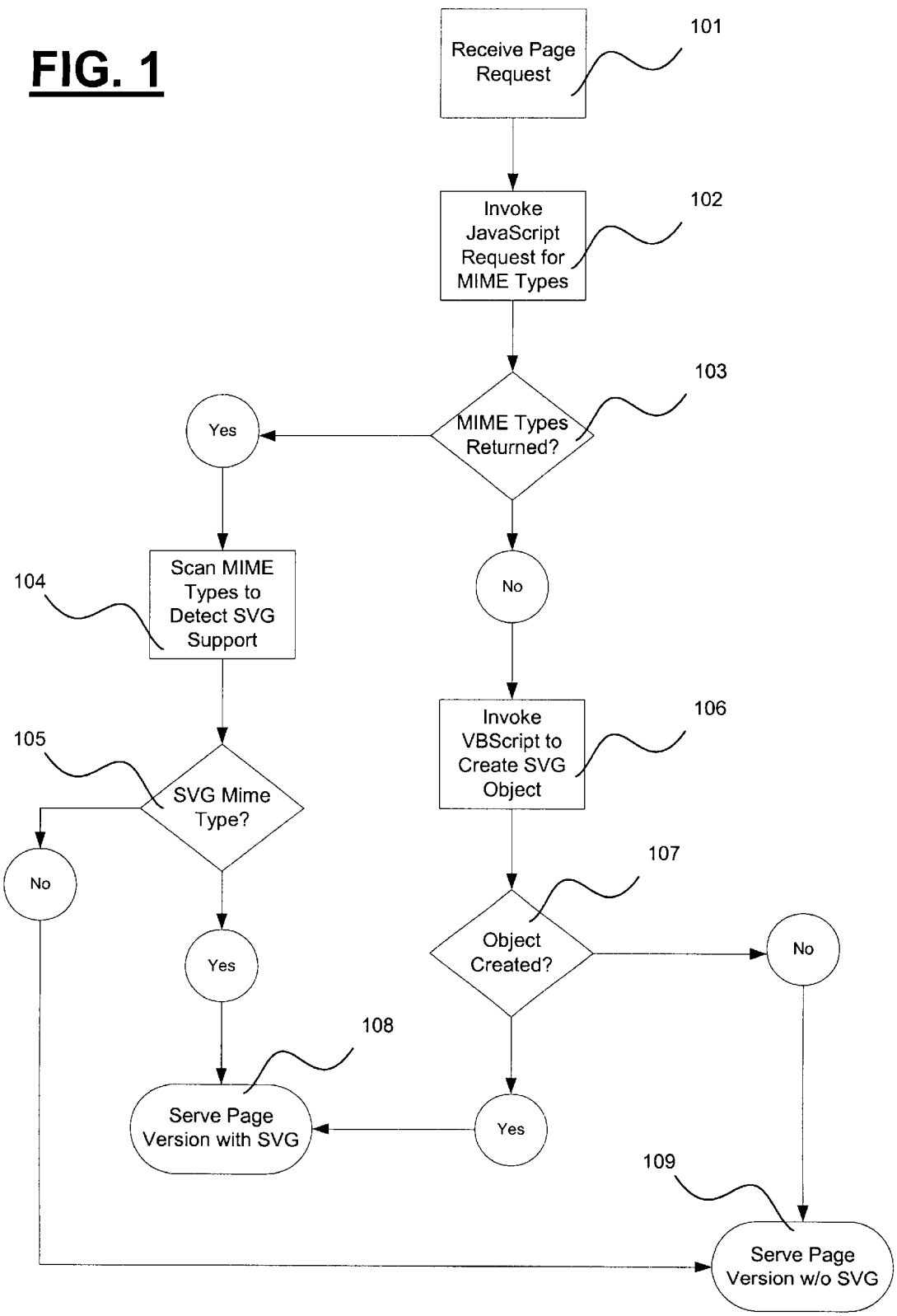
FIG. 1 is a flow diagram schematically illustrating a method for detecting scalable vector graphics support in a web browser according to embodiments of the present invention.

Reference will now be made in detail to the preferred embodiment of the present invention, examples of which are illustrated in the drawings.

A simple and commonly used automated method to detect language and/or technology support in a client browsers entails checking the accept request header fields the client browser sends to the server. Typically, MIME headers are sent by client browsers to HTTP servers to identify what languages (or "MIME types"), other than HTML, the browser supports. However, this method does not work in the case of SVG because SVG MIME headers are not currently sent to HTTP servers. Therefore, the present invention aims to detect whether a client browser supports SVG at the client side, i.e., by interacting with the client device that is running the browser.

The preferred method for automatically determining whether a browser supports SVG according to embodiments of the present invention uses a two prong process in an attempt to make a proper detection for various types of browsers, including, but not limited to Netscape's Navigator, NCSA's Mosaic, Sun Microsystem's HotJava™, and Microsoft's Internet Explorer.

In preferred embodiments of the invention, as depicted in FIG. 1, a request is made at the client browser 101 for a particular web page that is available in either a version containing SVG content or a version without SVG content. In response to the request, the HTML page containing JavaScript is invokes a request for a list of supported Multipurpose Internet Mail Extensions ("MIME") types 102 from the client browser. If the browser returns a list 103 containing one or more supported MIME types as requested, the returned list is scanned to detect SVG support 104. If scanning of these returned MIME types detects that SVG support is present, the version of the requested web page containing SVG content is sent to the browser 108 and the process ends. If no SVG support is detected in the returned MIME types, the non-SVG version of the web page is sent to the browser 109 and the process ends.

An example of a program listing for requesting MIME types from a browser, written in JavaScript 1.1, is provided below in Example 1.

EXAMPLE 1

```
<!--    Check if browsers have SVG support and
        record if we need to use a different detection
        method if the number of MIME types is 0. -->
<script language="JavaScript1.1">
        // Define variable to keep track of user's SVG support
        var hasSVGSupport = false;
        // Variable to indicate whether we need to use
        // a backup method to detect SVG support
        var useBackMethod = false;
        //Internet Explorer returns 0 as the number of MIME types,
        // so this code will not be executed by it. This is our indication
        // to use VBScript to detect SVG support.
        if (navigator.mimeTypes != null
                && navigator.mimeTypes.length > 0) {
                if (navigator.mimeTypes ["image/svg-xml"] != null){
                        hasSVGSupport = true;
                }
        } else {
                useBackMethod = true;
        }
</script>
```

The JavaScript code shown in Example 1 first creates a variable "hasSVGSupport" (that is similarly used throughout the other example scripts below) to track whether the client browser supports SVG content. Next, a second variable "useBackMethod" is defined which is used to track whether a backup method should be used to determine if SVG support is available. Next, the code checks to see if the list of MIME types exists and also contains greater than zero MIME types. If these conditions are both true, then the script searches for a specific MIME type, "image/svg-xml." If the type is found, SVG is supported and "hasSVGSupport" is set to "true" and the script ends.

As will be appreciated by one skilled in the art, while JavaScript v1.1 can be used to request a list of MIME types supported by the client browser, this MIME type approach does not work on some browsers. Most notably, the most current version of Internet Explorer, which is one of the most commercially popular browsers, provides an empty list of MIME types (with respect to Example 1 above, it returns 0 as the number of MIME types). Therefore, in the case where no MIME types are returned (such as Internet Explorer), a second backup approach is needed. In such a case, "useBackMethod" would be set to "true," thus indicating the need to use a backup method.

In the event that the browser returns an empty list of MIME types 103 in response to the JavaScript request 102, the method further comprises invoking Visual Basic Scripting Edition language (or "VBScript") code instructing the client browser to create an SVG object on the client device 107. If the object is created successfully, then SVG support has been detected and the browser is served the version of the web page having SVG content 108 and the process ends. If an error is returned in response to the attempt to create an SVG object, then SVG support is not present and the browser is served the non-SVG version of the web page.

An example of a program listing for detecting whether an SVG plug-in is present (and thus whether SVG is supported) in Internet Explorer browsers, written in VBScript, is provided below in Example 2.

EXAMPLE 2

```
<!--    VBScript to detect support of Adobe SVG
        plug-in as used by Internet Explorer. This
        code is not run on browsers which report
        they have MIME types. -->
<script language="VBScript">
        On Error Resume Next
        If useBackMethod = true Then
            hasSVGSupport = IsObject (CreateObject ("Adobe.SVGCtl"))
        End If
</script>
```

The script listed in Example 2 attempts to create an SVG plug-in object. If the object, "Adobe.SVGCtl," is created successfully (as would be the case with Internet Explorer having the Adobe SVG plug-in) then we know that this particular browser supports SVG. The result is reported appropriately in the form of the "hasSVGSupport" variable.

In step 108 and step 109 of FIG. 1, the appropriate version (SVG or non-SVG) of the requested web page is sent depending upon whether SVG support has been detected. An example of a program listing for serving the appropriate web page version to the browser, written in JavaScript v1.1, is provided below in Example 3.

EXAMPLE 3

```
<!--    Send user to appropriate URL based
        on their browser's SVG support -->
<script language="JavaScript1.1">
            if (hasSVGSupport == true) {
                // Send user to URL having SVG images
                location.replace ("show_SVG.html");
            } else {
                // Send user to URL with other graphic
                // formats
                location.replace ("show_non_SVG.html");
            }
</script>
```

In the script of Example 3, if SVG is supported (i.e., if variable "hasSVGSupport" has value "true") the browser is redirected to the version of the web page having SVG content. If SVG is not supported ("hasSVGSupport" does not have "true" as a value), then the browser is redirected to the URL of the web page version without SVG content.

As will be readily appreciated by one of ordinary skill in the art, the same functionality as stated above can be achieved (once SVG support is initially detected as described above) on subsequent page requests by the same browser by the use of cookies or a URL query parameter to store whether the client browser supports SVG. In this manner, the browser could be sent to the same URL regardless of whether it supports or does not support SVG. JavaServer Pages logic could then be used to determine whether SVG or other graphic types should be displayed on the requested page depending upon the cookie or URL query parameter as is known in the art.

Figure 2:
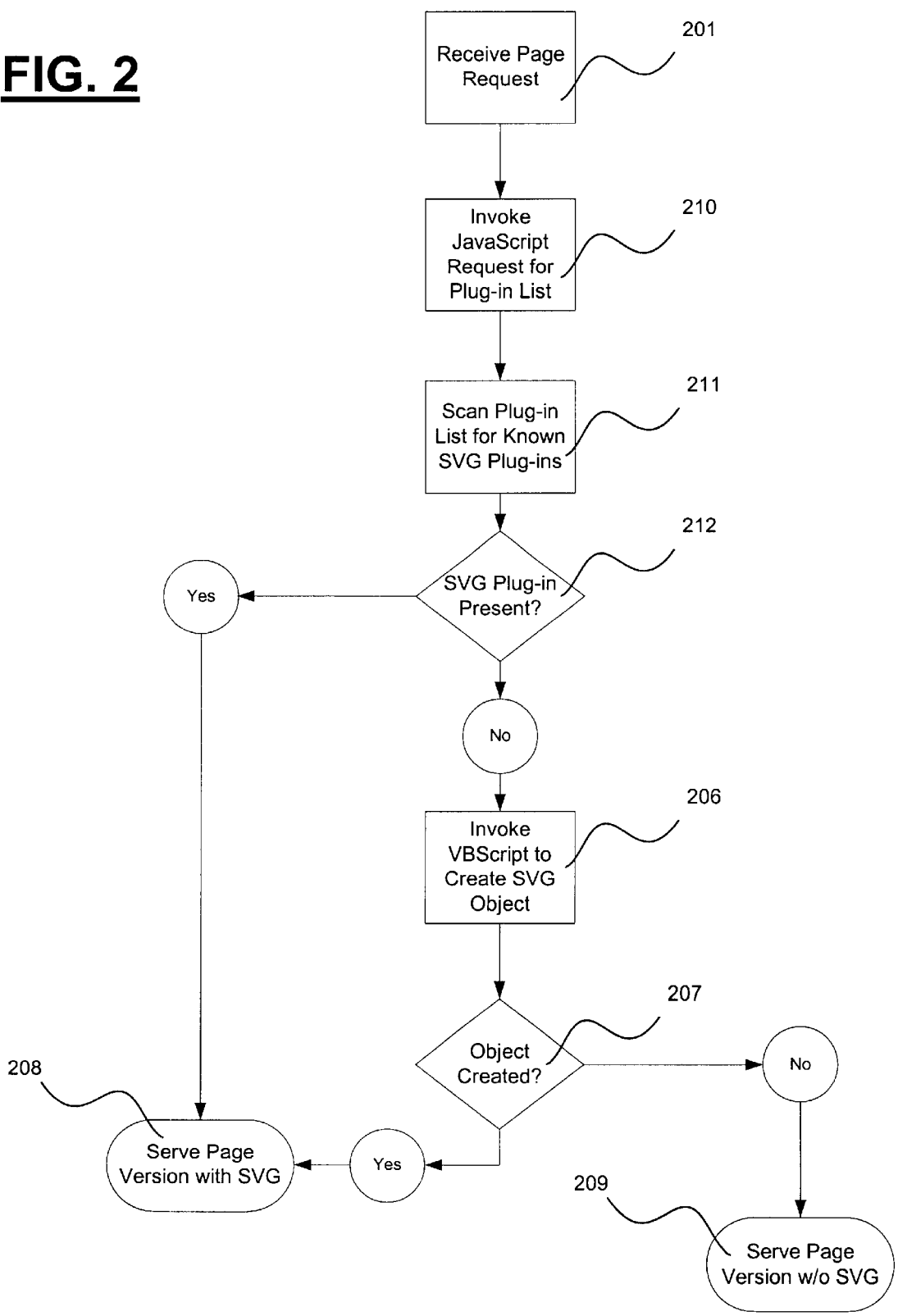
FIG. 2 is a flow diagram schematically illustrating a method for detecting scalable vector graphics support in a web browser according to alternative embodiments of the present invention.

In alternative embodiments of the present invention, as shown in FIG. 2, the method includes, after the page request is made 201, using JavaScript to request from the browser a list of its available plug-ins 210, and scanning a returned plug-in list 211 to determine whether SVG is supported 212. If a known SVG support plug-in is not detected in the returned list, VBScript is used as described above in Example 2 to instruct the browser to attempt to create an SVG object on the client device 206. If the SVG object is not created at 207, then the version of the requested web page without SVG content is served 209 to the client browser. If either a known plug-in is detected at 212, or an SVG object is created at step 207, the version of the requested web page having SVG content is served 208 to the client browser.

An example of a program listing for detecting known SVG plug-ins, written in JavaScript v1.1, is provided below in Example 4.

EXAMPLE 4

```
<!--    Check to see if one of the various
        known SVG plug-ins are present -->
<script language="JavaScript 1.1">
var hasSVGSupport = false;
var useBackMethod = false;
if (navigator.plugins != null && navigator.plugins.length > 0){
        if (navigator.plugins["Adobe SVG Viewer Plugin"]) {
            hasSVGSupport = true; }
} else {
        useBackMethod = true; }
</script>
```

However, it will be readily appreciated by one skilled in the art that the embodiment of the invention depicted by FIG. 2 is an alternative to the embodiment depicted by FIG. 1. While JavaScript can be used to detect the existence of a specific SVG plug-in as shown in Example 4, this approach may be less robust than those using MIME headers. Using plug-in detection, the JavaScript code must specify a particular plug-in name ("Adobe SVG Viewer Plugin" in Example 4) for which to scan. Therefore, the browser detection code would have to be updated as newer SVG plug-ins become available. By using MIME headers as is done in the preferred embodiment, all SVG viewers which are hooked into the browser are covered without the need to name them specifically in the detection code.

Additionally, the embodiment of FIG. 2 is limited to detecting only plug-in support for SVG content. Therefore, if a particular browser supported SVG directly (i.e., without the need for a plug-in) or with an external helper program, SVG support could not be detected unless the browser supported VBScript.

The preferred embodiments of the invention having thus being described, it will be readily apparent to one of ordinary skill in the art that many alterations, additions, and modifications to the embodiments of the invention may be made while still encompassing the spirit and scope of the present invention. Any and all such alterations, additions, and modifications are thus intended to be encompassed by the invention as claimed.

What is claimed is:

1. A method for automatically detecting whether a client browser supports scalable vector graphics, comprising:

receiving a page request from said client browser for a web page potentially having scalable vector graphics content defined therein;

requesting a list of MIME types from said client browser, said client browser returning list of supported MIME types;

if said return list contains one or more supported MIME types, scanning said return list to determine whether one of said supported MIME types is an SVG MIME type; and wherein if one of said supported MIME types is said SVG MIME type, designating said client browser as supporting scalable vector graphics; and if said return list contains zero supported MIME types, instructing said client browser to create an SVG object; and wherein if said browser successfully creates said SVG object, designating said client browser as supporting scalable vector graphics.

2. The method for automatically detecting whether a client browser supports scalable vector graphics according to claim 1, further comprising serving said web page to said client browser with said scalable vector graphics content if said client browser is designated as supporting scalable vector graphics, and serving said web page to said client browser without said scalable vector graphics content if said client browser is not designated as supporting scalable vector graphics.

3. The method for automatically detecting whether a client browser supports scalable vector graphics according to claim 2, wherein said serving of said web page comprises dynamically scripting said page using JavaServer Pages logic depending upon whether said client browser is designated as supporting scalable vector graphics.

4. The method for automatically detecting whether a client browser supports scalable vector graphics according to claim 2, further comprising serving a version of said web page without scalable vector graphics content if scalable vector graphic support is not designated, and serving a second version of said web page having scalable vector graphics content if scalable vector graphic support is designated.

5. The method for automatically detecting whether a client browser supports scalable vector graphics according to claim 1, wherein said requesting and scanning of said list of said supported MIME types step is performed by JavaScript.

6. The method for automatically detecting whether a client browser supports scalable vector graphics according to claim 1, wherein said instructing of said browser to create said SVG object is performed by VBScript.

7. The method for automatically detecting whether a client browser supports scalable vector graphics according to claim 1, wherein said designating of said client browser as supporting scalable vector graphics comprises an action selected from the group consisting of storing a cookie and setting a URL query parameter.

8. A method for automatically detecting whether a client browser supports scalable vector graphics, comprising:

receiving a page request from said client browser for a web page potentially having scalable vector graphics content defined therein;

requesting a list of plug-ins from said client browser, said client browser returning list of installed plug-ins;

scanning said list of installed plug-ins for one or more predetermined SVG plug-ins, and wherein if one of said installed plug-ins is one of said predetermined SVG plug-ins, designating said client browser as supporting scalable vector graphics; and wherein if said list of installed plug-ins does not contain at least one of said predetermined SVG plug-ins, instructing said client browser to create an SVG object; and wherein if said browser successfully creates said SVG object, designating said client browser as supporting scalable vector graphics.

9. The method for automatically detecting whether a client browser supports scalable vector graphics according to claim 8, further comprising serving said web page to said client browser with said scalable vector graphics content if said client browser is designated as supporting scalable vector graphics, and serving said web page to said client browser without said scalable vector graphics content if said client browser is not designated as supporting scalable vector graphics.

10. The method for automatically detecting whether a client browser supports scalable vector graphics according to claim 9, wherein said serving of said web page comprises dynamically scripting said page using JavaServer Pages logic depending upon whether said client browser is designated as supporting scalable vector graphics.

11. The method for automatically detecting whether a client browser supports scalable vector graphics according to claim 9, further comprising serving a version of said web page without scalable vector graphics content if scalable vector graphic support is not designated, and serving a second version of said web page having scalable vector graphics content if scalable vector graphic support is designated.

12. The method for automatically detecting whether a client browser supports scalable vector graphics according to claim 8, where in said requesting and scanning of said list of said installed plug-ins step is performed by JavaScript.

13. The method for automatically detecting whether a client browser supports scalable vector graphics according to claim 1, wherein said instructing of said browser to create said SVG object is performed by VBScript.

14. The method for automatically detecting whether a client browser supports scalable vector graphics according to claim 1, wherein said designating of said client browser as supporting scalable vector graphics comprises an action selected from the group consisting of storing a cookie and setting a URL query parameter.

* * * * *

UNITED STATES PATENT AND TRADEMARK OFFICE
CERTIFICATE OF CORRECTION

PATENT NO.     : 6,664,974 B2
DATED          : December 16, 2003
INVENTOR(S)    : Ana M. Lindstrom-Tamer It is certified that error appears in the above-identified patent and that said Letters Patent is hereby corrected as shown below:

Column 8,
Line 47, "where in" should be -- wherein --

Signed and Sealed this

Sixteenth Day of March, 2004

JON W. DUDAS
*Acting Director of the United States Patent and Trademark Office*